United States Patent
Miyatake et al.

(10) Patent No.: US 6,970,216 B1
(45) Date of Patent: Nov. 29, 2005

(54) OPTICAL ELEMENT AND LIQUID-CRYSTAL DISPLAY

(75) Inventors: Minoru Miyatake, Osaka (JP); Takafumi Sakuramoto, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/469,162

(22) Filed: Dec. 21, 1999

(30) Foreign Application Priority Data

Dec. 21, 1998 (JP) .......................................... 10-376393

(51) Int. Cl.$^7$ .......................................... G02F 1/1335
(52) U.S. Cl. ...................................... 349/112; 359/494
(58) Field of Search ........................... 349/112, 96, 64; 359/494

(56) References Cited

U.S. PATENT DOCUMENTS

| | | | |
|---|---|---|---|
| 2,123,901 A | | 7/1938 | Land ................................ 88/1 |
| 4,688,900 A | | 8/1987 | Doane et al. ........... 350/347 V |
| 5,783,120 A | * | 7/1998 | Ouderkirk et al. .......... 264/1.34 |
| 5,825,542 A | * | 10/1998 | Cobb et al. .................. 359/487 |
| 5,825,543 A | * | 10/1998 | Ouderkirk et al. ........... 359/494 |
| 5,867,316 A | * | 2/1999 | Carlson et al. .............. 359/500 |
| 5,953,089 A | * | 9/1999 | Hiji et al. .................... 349/112 |
| 5,991,077 A | * | 11/1999 | Carlson et al. .............. 359/500 |
| 5,995,183 A | * | 11/1999 | Tsuyoshi ..................... 349/112 |
| 6,031,665 A | * | 2/2000 | Carlson et al. .............. 359/494 |
| 6,236,439 B1 | * | 5/2001 | Saiki et al. .................. 349/117 |
| 6,310,671 B1 | * | 10/2001 | Larson ......................... 349/96 |
| 6,361,838 B1 | * | 3/2002 | Miyatake et al. ........... 428/1.31 |
| 6,369,945 B1 | * | 4/2002 | Sakuramoto et al. ....... 359/494 |
| 6,392,802 B2 | * | 5/2002 | Miyatake et al. ........... 359/494 |

FOREIGN PATENT DOCUMENTS

| | | | |
|---|---|---|---|
| EP | 0 506 176 A1 | 9/1992 | ............ C09K/19/54 |
| JP | 9-274108 | 10/1997 | ............ G02B/5/30 |
| WO | 87/01822 | 3/1987 | ............ G02F/1/13 |
| WO | 97/32224 | 9/1997 | ............ G02B/5/30 |

* cited by examiner

Primary Examiner—Toan Ton
Assistant Examiner—David Chung
(74) Attorney, Agent, or Firm—Sughrue Mion, PLLC

(57) ABSTRACT

An optical element of the present invention is constituted by a multilayer structure having a polarizing plate, and a light diffusing plate. The light diffusing plate is formed of a birefringent film containing dispersed therein minute regions differing from the birefringent film in birefringent characteristics. The minute regions are formed of a thermoplastic liquid-crystal polymer. The difference in refractive index between the birefringent film and the minute regions in a direction perpendicular to the axis direction in which a linearly polarized light has a maximum transmittance, $\Delta n^1$, is 0.03 or larger and that in said axis direction, $\Delta n^2$, is not larger than 80% of the $\Delta n^1$. Furthermore, the $\Delta n^1$ direction for the light diffusing plate is parallel to the transmission axis of the polarizing plate. A liquid-crystal display of the present invention has a liquid-crystal cell and the optical element disposed on one or each side of the cell.

10 Claims, 1 Drawing Sheet

OPTICAL ELEMENT AND LIQUID-CRYSTAL DISPLAY

BACKGROUND OF THE INVENTION

1. Field of the Invention

The present invention relates to an optical element which has anisotropy in the scattering of linearly polarized light and is highly effective in diffusing the directions of the scattering thereof, and which is suitable for use in, e.g., improving the perceptibility of liquid-crystal displays and the like.

The present application is based on Japanese Patent Application No. Hei. 10-376393 which is incorporated herein by reference.

2. Description of the Related Art

An optical element has conventionally been known which comprises a polarizing plate and superposed thereon a light diffusing plate which is either a plastic film containing fine transparent particles dispersed therein or a plastic film having a roughened surface. This light diffusing plate effectively functions, in transmission type liquid-crystal displays and the like, to diminish the image of the backlight to thereby improve the perceptibility of the devices. However, in reflection type liquid-crystal displays and the like, the conventional optical element has had a problem that the light incident through the light diffusing plate interferes with the outgoing diffused light to cause considerable image fogging or blurring.

The above image fogging or blurring can be reduced by disposing the light diffusing plate so as to be in contact with the liquid-crystal cell. In this constitution, however, the linearly polarized light which has passed through the polarizing plate strikes on the light diffusing plate. As a result, the polarized state is eliminated, leading to a reduced contrast. In particular, in displaying black images, the poorly polarized state leads to white blurring, which is the phenomenon in which a dark image becomes whitish due to scattered light.

On the other hand, other known light diffusing plates include: a diffusing plate which comprises a matrix and, dispersedly contained therein, regions having anisotropy in refractive index and which is anisotropic with respect to the scattering of linearly polarized light; and diffusing plates of the above kind which comprise a combination of a thermoplastic resin and a low-molecular liquid crystal, a combination of a low-molecular liquid crystal and a photocrosslinkable low-molecular liquid crystal, and a combination of poly(vinyl alcohol) and a low-molecular liquid crystal, respectively (see U.S. Pat. No. 2,123,901, WO 87/01822, EP 0506176, and JP-A-9-274108 or the like). (The term "JP-A" as used herein means an "unexamined published Japanese patent application".) However, these light diffusing plates are unsuitable for practical use, for example, because they are difficult to produce and because when applied to liquid-crystal displays or the like, the diffusing plates have poor handleability and poor stability of functions.

SUMMARY OF THE INVENTION

An object of the present invention is to provide an optical element and a liquid-crystal display which each employs a light diffusing plate easily producible and excellent in thermal and chemical stability and suitability for practical use and is less apt to suffer a contrast decrease or white blurring even when the light diffusing plate is interposed between a liquid-crystal cell and a polarizing plate for the purpose of preventing image fogging or blurring.

An optical element of the present invention is constituted by a multilayer structure having a polarizing plate, and a light diffusing plate. The light diffusing plate comprises a birefringent film containing dispersed therein minute regions differing from the birefringent film in birefringent characteristics. The minute regions are formed of a thermoplastic liquid-crystal polymer. The difference in refractive index between the birefringent film and the minute regions in a direction perpendicular to the axis direction in which a linearly polarized light has a maximum transmittance, $\Delta n^1$, is 0.03 or larger and that in said axis direction, $\Delta n^2$, is not larger than 80% of the $\Delta n^1$. Furthermore, the $\Delta n^1$ direction for the light diffusing plate is parallel to the transmission axis of the polarizing plate. A liquid-crystal display of the present invention has a liquid-crystal cell and the optical element disposed on one or each side of the cell.

The minute regions are preferably formed of a thermoplastic branched liquid-crystal polymer having side chains each containing a segment represented by general formula (I): —Y—Z—, wherein Y is one of a polymethylene chain, a polyoxymethylene chain and a polyoxyethylene chain branching from the main chain and Z is a para-substituted cyclic compound.

In the light diffusing plate in the present invention, the minute regions and the matrix dispersedly containing the same each is made of a polymeric material. Consequently, the light diffusing plate not only is excellent in raw-material handleability and easily producible but has excellent stability of optical functions and excellent suitability for practical use due to the thermal and chemical stability of those materials. Furthermore, in the axis direction ($\Delta n^2$ direction) in which a linearly polarized light has a maximum transmittance, the linearly polarized light passes through the diffusing plate while satisfactorily retaining its polarized state. In directions ($\Delta n^1$ directions) perpendicular to the $\Delta n^2$ direction, the linearly polarized light is scattered based on the difference in refractive index $\Delta n^1$ between the birefringent film and the minute regions, whereby the polarized state is diminished or eliminated.

Consequently, by orienting the polarizing plate so that the transmission axis thereof is parallel to $\Delta n^1$ directions for the light diffusing plate, it becomes possible to enable the linearly polarized light which has passed through the polarizing plate to scatter and satisfactorily diffuse upon incidence into the light diffusing plate. Namely, the linearly polarized light can be inhibited from giving, upon incidence, a reflected light which may adversely influence a display light. As a result, even when the light diffusing plate is disposed between a reflection type liquid-crystal cell and a polarizing plate, a decrease in contrast or the generation of white blurring can be inhibited and perceptibility can be improved.

Features and advantages of the invention will become understood from the following detailed description of the preferred embodiments described in conjunction with the attached drawings.

DETAILED DESCRIPTION OF THE PREFERRED EMBODIMENTS

An optical element of the present invention comprises a multilayer structure having a polarizing plate, and a light diffusing plate. The light diffusing plate comprises a birefringent film containing dispersed therein minute regions differing from the birefringent film in birefringent characteristics. The minute regions comprise a thermoplastic liquid-crystal polymer. The difference in refractive index between the birefringent film and the minute regions in a direction perpendicular to the axis direction in which a linearly polarized light has a maximum transmittance, $\Delta n^1$, is 0.03 or larger and that in said axis direction, $\Delta n^2$, is not larger than 80% of the $\Delta n^1$. Furthermore, the $\Delta n^1$ direction for the light diffusing plate is parallel to the transmission axis of the polarizing plate. The minute regions may be formed of a thermoplastic branched liquid-crystal polymer having side chains each containing a segment represented by general formula (I): —Y—Z—, wherein Y is one of a polymethylene chain, a polyoxymethylene chain and a polyoxyethylene chain branching from the main chain and Z is a para-substituted cyclic compound.

Figure 1:
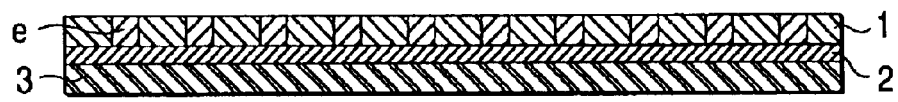
FIG. 1 is a sectional view of one embodiment of the optical element.
Figure 2:
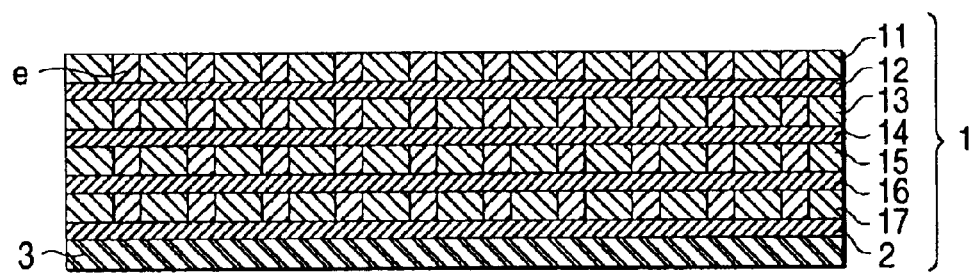
FIG. 2 is a sectional view of another embodiment of the optical element.

Embodiments of the optical element according to the present invention are shown in FIGS. 1 and 2. Numeral 1 denotes a light diffusing plate, 3 a polarizing plate, and 2 an adhesive layer as an optional component. The light diffusing plate 1 may consist of one birefringent film dispersedly containing minute regions e which differ from the film in birefringent characteristics. Alternatively, as shown in FIG. 2, the light diffusing plate 1 may consist of a multilayer structure comprising such birefringent films 11, 13, 15, and 17. In FIG. 2, numerals 12, 14, and 16 each denotes an adhesive layer.

For forming the birefringent film dispersedly containing minute regions differing from the film in birefringent characteristics, a suitable method can be used. For example, one or more polymers serving as a matrix and one or more thermoplastic liquid-crystal polymers described above serving as minute regions are used in such a combination that a film of a mixture thereof comes to have regions differing from the matrix in birefringent characteristics through an appropriate orientation treatment, e.g., stretching, to form an oriented film.

As the matrix polymers, suitable transparent polymers can be used without particular limitations. Examples thereof include polyester polymers such as poly(ethylene terephthalate) and poly(ethylene naphthalate), styrene polymers such as polystyrene and acrylonitrile/styrene copolymers (AS resins), olefin polymers such as polyethylene, polypropylene, polyolefins having cyclic or norbornene structures, and ethylene/propylene copolymers, carbonate polymers, acrylic polymers such as poly(methyl methacrylate), vinyl chloride polymers, cellulosic polymers such as cellulose diacetate and cellulose triacetate, amide polymers such as nylons and aromatic polyamides, imide polymers, sulfone polymers, polyethersulfone polymers, polyetheretherketone polymers, poly(phenylene sulfide) polymers, vinyl alcohol polymers, vinylidene chloride polymers, vinyl butyral polymers, acrylate polymers, polyoxymethylene polymers, and blends of these.

On the other hand, the thermoplastic liquid-crystal polymers of the minute regions may be selected from either branched type liquid-crystal polymers or main chain type liquid-crystal polymers. The thermoplastic branched liquid-crystal polymers are selected from thermoplastic liquid-crystal polymers having side chains each containing a segment represented by general formula (I): —Y—Z—, wherein Y is one of a polymethylene chain, a polyoxymethylene chain and a polyoxyethylene chain branching from the main chain and Z is a para-substituted cyclic compound. Consequently, examples of the branched liquid-crystal polymers include polymers having segments which each is a monomer unit represented by the following general formula (II).

General Formula (II):

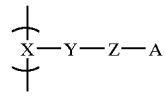

In the above general formula, Y is a flexible spacer group, which is one of a polymethylene chain $[-(CH_2)_n-]$, a polyoxymethylene chain $[-(CH_2O)_m-]$, polyoxyethylene chain $[-(CH_2CH_2O)_m-]$. In these chains, n and m, which each indicates the number of repetitions, can be suitably determined according to, for example, the chemical structure of the mesogenic group Z bonded thereto. In general, n is from 0 to 20, preferably from 2 to 12, and m is from 0 to 10, preferably from 1 to 4.

From the standpoint of forming a birefringent film while regulating refractive index and from other standpoints preferred examples of the spacer group Y include ethylene, propylene, butylene, pentylene, hexylene, octylene, decylene, undecylene, dodecylene, octadecylene, ethoxyethylene, and methoxybutylene.

On the other hand, Z is a para-substituted cyclic compound serving as a mesogenic group imparting the property of undergoing liquid-crystalline orientation. Examples thereof include compounds having a para-substituted, aromatic or cyclohexyl unit such as the azomethine, azo, azoxy, ester, tolan, phenyl, biphenyl, phenylcyclohexyl, or bicyclohexyl type.

Preferred examples of the para-substituted cyclic compound Z, from the standpoint of forming a birefringent film while regulating refractive index and from other standpoints, include those represented by the following chemical formulae.

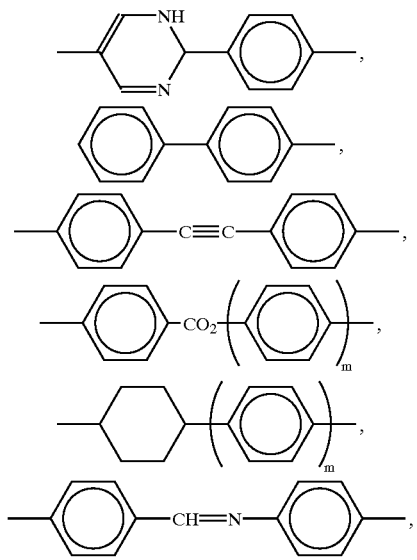

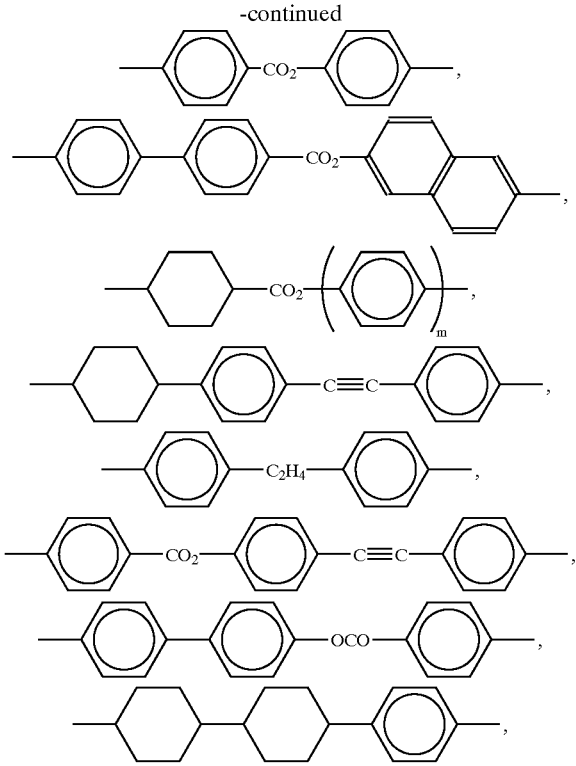

In the monomer unit represented by general formula (II), the spacer group Y and the mesogenic group Z may be bonded to each other through an ether bond, —O—. Furthermore, in the phenyl group(s) contained in the para-substituted cyclic compound, one or two hydrogen atoms may have been replaced with a halogen. In this case, the halogen is preferably chlorine or fluorine.

In general formula (II), X is a backbone group constituting the main chain of the liquid-crystal polymer. In the present invention, the backbone group may contain appropriate connecting groups such as, e.g., linear, branched, or cyclic groups. Examples thereof include polyacrylates, polymethacrylates, poly(α-haloacrylate)s, poly(α-cyanoacrylate)s, polyacrylamides, polyacrylonitriles, polymethacrylonitriles, polyamides, polyesters, polyurethanes, polyethers, polyimides, and polysiloxanes.

The terminal substituent A as the para-substituent of the para-substituted cyclic compound may be an appropriate substituent such as, e.g., a cyano group, an alkyl group, an alkenyl group, an alkoxy group, an oxaalkyl group, a halogen, or an alkyl, alkoxy, or alkenyl group in which one or more of the hydrogen atoms have been replaced with fluorine or chlorine atoms.

Consequently, the branched liquid-crystal polymer may be a polymer which is thermoplastic and, at room temperature or elevated temperatures, undergoes appropriate orientation, i.e., comes into a nematic or smectic phase. The liquid-crystal polymer may be a homopolymer made up of monomer units represented by general formula (II), or may be a copolymer containing these monomer units.

The matrix polymer and branched liquid-crystal polymer described above are preferably used in such a combination as to undergo phase separation, from the standpoint of the even distribution of minute regions in the birefringent, film to be obtained and from other standpoints. The distribution of minute regions can be regulated by selecting a suitable combination having a given degree of compatibility. Phase separation can, for example, be accomplished by a method in which incompatible materials are dissolved in a solvent to prepare a solution thereof or by a method in which incompatible materials are mixed together with heating and melting.

In the case of forming a birefringent film through the aforementioned stretching/orientation treatment, the stretching can be conducted at any desired temperature in any desired stretch ratio to form the target birefringent film. The aforementioned polymers include anisotropic polymers which are classified as positive or negative polymers by the change in stretch-direction refractive index through stretching. In the present invention, however, either of such positive and negative, anisotropic polymers can be used.

The film to be oriented can be obtained by an appropriate technique such as, e.g., casting, extrusion molding, injection molding, rolling, or flow casting. It is also possible to obtain the film by spreading a monomer mixture and polymerizing the spread mixture by heating, irradiation with, e.g., ultraviolet, etc.

From the standpoint of obtaining a birefringent film containing highly evenly distributed minute regions and from other standpoints, a preferred method is to use a solution of a mixture of a matrix polymer and a branched liquid-crystal polymer in a solvent to form a film therefrom through casting, flow casting, etc. In this case, the size and distribution of minute regions can be regulated by changing the kind of the solvent, viscosity of the polymer mixture solution, rate of the drying of the spread polymer mixture solution layer, etc. For example, an advantageous technique for reducing the area of each of minute regions is, for example, to use a polymer mixture solution having a reduced viscosity or to dry the spread polymer mixture solution layer at an increased rate.

The thickness of the film to be oriented can be suitable determined. However, from the standpoint of suitability for orientation and from other standpoints, the thickness thereof is generally from 1 $\mu$m to 3 mm, preferably from 5 $\mu$m to 1 mm, more preferably from 10 to 500 $\mu$m. In forming the film, appropriate additives can be incorporated, such as, e.g., a dispersant, surfactant, ultraviolet absorber, color tone regulator, flame retardant, release agent, and antioxidant.

Orientation can be accomplished by conducting one or more appropriate treatments capable of regulating refractive index through orientation. Examples of the orientation treatments include: stretching treatments such as uni- or biaxial stretching, successive biaxial stretching, and stretching along a Z axis; a rolling technique; a technique in which an electric or magnetic field is applied to the film kept at a temperature not lower than the glass transition or liquid-crystal transition point thereof and the film is then rapidly cooled to fix the orientation; a technique in which polymer molecules are oriented during film formation by means of flow orientation; and a technique in which a liquid-crystal polymer is caused to orient by itself based on the slight orientation of an isotropic polymer. Consequently, the birefringent film obtained may be a stretched film or unstretched film. Although a stretched film can be obtained from a brittle polymer, it is especially preferably obtained from a highly stretchable polymer.

The birefringent film used in the present invention has been regulated so that the difference in refractive index between the birefringent film and the minute regions in a direction perpendicular to the axis direction in which a linearly polarized light has a maximum transmittance, $\Delta n^1$, is 0.03 or larger and that in said axis direction, $\Delta n^2$, is not larger than 80% of the $\Delta n^1$. By regulating the birefringent film so as to have such differences in refractive index, the film can have the excellent ability to scatter light in $\Delta n^1$ directions and to maintain a polarized state in the $\Delta n^2$ direction.

From the standpoints of scattering properties and of changing or eliminating a polarized state based on the scattering and from other standpoints, it is preferred that the difference in refractive index in a $\Delta n^1$ direction, $\Delta n^1$, be a moderately large value. Specifically, $\Delta n^1$ is preferably from 0.04 to 1, more preferably from 0.045 to 0.5. On the other hand, from the standpoint of maintaining a polarized state and from other standpoints, it is preferred that the difference in refractive index in the $\Delta n^2$ direction, $\Delta n^2$, be as small as possible. Specifically, $\Delta n^2$ is preferably 0.03 or smaller, more preferably 0.02 or smaller, most preferably 0.01 or smaller.

Consequently, the orientation described above can be regarded as a treatment for increasing the difference in refractive index in a $\Delta n^1$ direction between the birefringent film and the minute regions, or as a treatment for reducing the difference therebetween in refractive index in the $\Delta n^2$ direction, or as a treatment for accomplishing both.

In the birefringent film, the minute regions are preferably dispersed and distributed as evenly as possible from the standpoints of homogeneity in the aforementioned scattering effect, etc. The size of the minute regions, especially the length thereof in $\Delta n^1$ directions, which are directions of scattering, relates to backward scattering (reflection) and wavelength dependence. From the standpoint of inhibiting backward scattering, the $\Delta n^1$-direction length of the minute regions is preferably as small as possible, e.g., on the order of several micrometers. On the other hand, from the standpoint of diminishing the wavelength dependence of scattered light, the $\Delta n^1$-direction size of the minute regions is preferably as large as possible, although this adversely influences the above-described inhibition of backward scattering.

From the standpoints of the above-described inhibition of backward scattering and wavelength dependence, etc. and, hence, from the standpoints of improving the efficiency of light utilization, preventing coloration due to wavelength dependence, preventing the minute regions from being visually perceived to impair bright displaying, and attaining satisfactory film-forming properties and film strength, etc., the size of the minute regions in terms of the $\Delta n^1$-direction length thereof is preferably from 0.05 to 500 $\mu$m, more preferably from 0.5 to 100 $\mu$m, most preferably from 1 to 50 $\mu$m. The $\Delta n^2$-direction length of the minute regions, which are present usually as domains in the birefringent film, is not particularly limited.

As described above, the birefringent film for use in the present invention has anisotropy in birefringent characteristics between the $\Delta n^1$ direction and the $\Delta n^2$ direction so that a linearly polarized light can be controlled according to vibration planes. Although the proportion of the minute regions in the birefringent film can be suitably determined from the standpoints of $\Delta n^1$ direction scattering, etc., it is generally from 0.1 to 70%, preferably from 0.5 to 50%, more preferably from 1 to 30%, from the standpoint of further attaining a satisfactory film strength, etc.

The light diffusing plate for use in the present invention may consist of only one birefringent film 1 containing dispersed therein minute regions differing from the film in birefringent characteristics, as shown in FIG. 1. Alternatively, it may comprise such birefringent films 11, 13, 15, and 17 superposed on each other, as shown in FIG. 2. This film superposition can bring about a synergistic scattering effect higher than the scattering effect expected from the thickness increase.

The superposed structure may be one obtained by superposing birefringent films while positioning each film at any desired angle with respect to the $\Delta n^1$ or $\Delta n^2$ direction. However, from the standpoints of enhancing the scattering effect, etc., it is preferred to superpose the films in such a manner that the $\Delta n^1$ directions for any film layer are parallel to those for the adjacent layer(s). The number of superposed birefringent films can be an appropriate number of 2 or larger.

The birefringent films to be superposed may have the same or different values of $\Delta n^1$ or $\Delta n^2$. With respect to the parallelism in, e.g., $\Delta n^1$ direction between adjacent layers, fluctuations of parallelism caused by operational errors are allowable, although a higher degree of parallelism is preferred. In the case of a layer which has fluctuations in, e.g., $\Delta n^1$ direction, the parallelism is based on the average of these.

The birefringent films in the superposed structure may be in a merely stacked state. It is, however, preferred that the birefringent films have been bonded to each other through an adhesive layer or the like from the standpoints of preventing film shifting in, e.g., $\Delta n^1$ directions and preventing foreign substances from coming into each interface and from other standpoints. For the bonding, an appropriate adhesive can be used, such as a hot-melt or pressure-sensitive adhesive. From the standpoint of diminishing reflection loss, an adhesive layer whose refractive index is as close as possible to that of the birefringent films is preferred. It is also possible to bond the birefringent films with the same polymer as that constituting either the films or the minute regions contained therein.

For practical use, the optical element according to the present invention, which comprises a multilayer structure having the light diffusing plate and a polarizing plate, may be a multilayer structure having appropriate optical parts, such as, e.g., a phase plate, according to need in addition to those essential components. In this multilayer structure, the components may be in a merely stacked state or may have been bonded to each other through an adhesive layer or the like. With respect to this adhesive layer, the same explanation can be given as in the superposition of birefringent films.

There are no particular limitations on the optical parts which may be optionally superposed, and appropriate ones may be used. Examples thereof include a phase plate, a backlight such as a light guide plate, a reflector plate, a polarizing separator plate comprising, e.g., a multilayered film, and a liquid-crystal cell. Such optical parts to be superposed, including the polarizing plate and a phase plate, may be any of various types.

Specifically, examples of the polarizing plate include absorption type, reflection type, and scattering type polarizers, while examples of the phase plate include a quarter-wavelength plate, half-wavelength plate, a phase plate comprising a uni- or biaxially or otherwise stretched film, one comprising a film which has undergone inclined orientation, i.e., which has undergone molecular orientation also in the thickness direction, one comprising a liquid-crystal polymer, one in which a phase difference caused by a viewing angle or birefringence is compensated for, and one comprising two or more of these phase plates superposed on each other. In the present invention, any of these can be used.

Specific examples of the polarizing plate include absorption type polarizing plates obtained by adsorbing iodine or a dichroic substance, e.g., a dichroic dye, onto a hydrophilic polymer film, such as a poly(vinyl alcohol) film, a film of poly(vinyl alcohol) which has undergone partial conversion into formal, or a film of a partially saponified ethylene/vinyl acetate copolymer, and then stretching the film. Examples thereof further include oriented polyene films such as a film of dehydrated poly(vinyl alcohol) and a film of dehydrochlorinated poly(vinyl chloride).

Examples of the polarizing plate still further include a polarizing plate comprising any of the aforementioned polarizing films and a transparent protective layer formed on one or each side thereof for the purpose of protection against water, etc. The protective layer may be, for example, a coating layer of a plastic or a laminated film layer. The transparent protective layer may contain fine transparent particles having an average particle diameter of from 0.5 to 20 $\mu$m so as to impart fine roughness to the surface of the above polarizing plate. Examples of such fine transparent particles include fine inorganic particles which may be electroconductive, such as silica, alumina, titania, zirconia, tin oxide, indium oxide, cadmium oxide, and antimony oxide particles, and fine organic particles made of a crosslinked or uncrosslinked polymer.

From the standpoint of improving brightness and contrast and from other standpoints, preferred polarizing plates are those attaining a high degree of polarization, such as the above-described absorption type polarizing plates containing a dichroic substance. Especially preferred among such polarizing plates are those having a light transmittance of 40% or higher and a degree of polarization of 95.0% or higher, in particular 99% or higher.

On the other hand, specific examples of the phase plate include stretched films made of any of the polymers enumerated hereinabove with regard to the birefringent film or made of a liquid-crystal polymer especially of the twisted alignment type. Furthermore, examples of the light guide plate include one which comprises a transparent resin plate and, disposed by a side edge thereof, either a line light source such as a (cold or hot) cathode tube or a light source such as one or more light-emitting diodes or ELs and has such a constitution that the light transmitted by the resin plate is emitted from one side of the plate through diffusion, reflection, diffraction, interference, etc.

In fabricating the optical element containing a light guide plate, use can be made of a suitable combination of the light guide plate with one or more auxiliary means disposed according to need in predetermined positions, e.g., on the upper or lower surface of the light guide plate or at a side edge thereof. Examples of such auxiliary means include a prism array layer which comprises a prism sheet or the like and is used for controlling the direction of light emission, a diffusing plate for obtaining even illumination, and a light source holder for introducing the light emitted by a line light source into a side edge of the light guide plate.

The multilayer structure constituting the optical element according to the present invention may comprise the light diffusing plate and a polarizing plate as described above, or may further contain one or more optical parts other than polarizing plates. The multilayer structure may also be one containing two or more optical parts of the same kind, e.g., phase plates. In this case, these optical parts of the same kind, e.g., phase plates, may have the same or different properties. One or more light diffusing plates may be contained in the optical element. These light diffusing plates may be disposed in appropriate positions outside or within the multilayer structure, e.g., on one or each outer side of the multilayer structure or on one or each side of an optical part contained in the multilayer structure.

In the optical element according to the present invention, the light diffusing plate and the polarizing plate are disposed in such positions that the $\Delta n^1$ directions for the light diffusing plate are parallel to the transmission axis of the polarizing plate, from the standpoint of effectively utilizing the transmitting/scattering properties of the light diffusing plate and from other standpoints. Because of this, the linearly polarized light which has passed through the polarizing plate can be scattered by the light diffuse plate in $\Delta n^1$ directions. With respect to the above parallelism, the same explanation can be given as in the case of superposing birefringent films described hereinabove.

Since the optical element according to the present invention has the advantages described above, it is suitable for use in a display control plate or the like. This display control plate comprises a light diffusing plate reduced in backward scattering and having high haze anisotropy. The light diffusing plate is interposed between a liquid-crystal cell and a viewing-side polarizing plate to selectively scatter only the linearly polarized light corresponding to white displaying. Namely, the display control plate is intended to secure satisfactory displaying without reducing image brightness or contrast.

Figure 3:
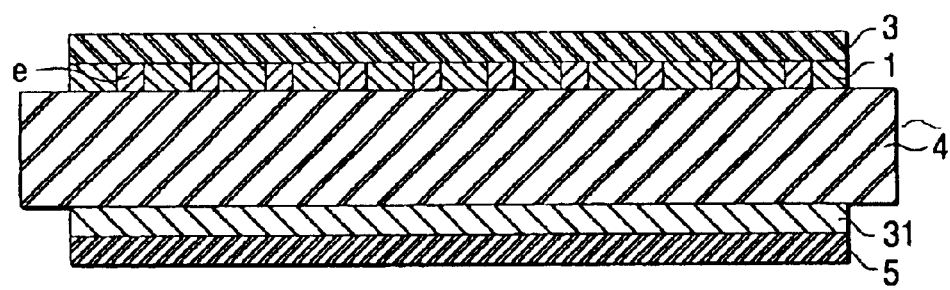
FIG. 3 is a sectional view of a liquid-crystal display.

The optical element according to the present invention is suitable also for use in a liquid-crystal display due to the above-described advantages thereof. An example of the liquid-crystal display is shown in FIG. 3, wherein numeral 1 denotes a light diffusing plate, 3 and 31 each a polarizing plate, 4 a liquid-crystal cell, and 5 a mirror reflector. The example shown in FIG. 3 is a reflection type liquid-crystal display. The light diffusing plate 1 is interposed between the viewing-side polarizing plate 3 and the liquid-crystal cell 4 so that the $\Delta n^1$ directions therefor are parallel to the transmission axis of the polarizing plate. Consequently, this display has the same structure as the display control plate described above.

In general, a liquid-crystal display is fabricated, for example, by suitably assembling components including a polarizing plate, a liquid-crystal cell, a reflector or backlight, and optional optical parts and integrating a driving circuit into the assemblage. In the present invention, a liquid-crystal display can be fabricated according to such a conventional procedure without particular limitations, except that the optical element described above is used. Consequently, appropriate optical parts can be suitably disposed in fabricating the liquid-crystal display. For example, a light diffusing plate, anti-glare layer, antireflection film, protective layer, or protective plate may be disposed over a viewing-side polarizing plate. Furthermore, a phase plate for compensation may be interposed, for example, between the liquid-crystal cell and the viewing-side polarizing plate.

The phase plate for compensation is intended, for example, to compensate for the wavelength dependence of birefringence, etc. to thereby improve perceptibility, as described above. This phase plate is disposed, for example, between the liquid-crystal cell and at least one of polarizing plates disposed respectively on the viewing side and on the backlight side. As the above phase plate for compensation, a suitable phase plate such as that described above can be used according to wavelength region, etc. The phase plate for compensation may be composed of two or more layers each serving as a phase plate.

In the liquid-crystal display described above, one or more optical elements according to the present invention can be disposed in appropriate positions on one or each side of the liquid-crystal cell. For example, the light diffusing plate is disposed in one or more positions where the linearly polarized light which has passed through a polarizing plate is desired to be diffused, e.g., on the light incidence side or light emission side of a polarizing plate, especially one disposed on the viewing side, between a polarizing plate and a phase plate for compensation, between a phase plate for compensation and a liquid-crystal cell, or between a liquid-crystal cell and a reflector. With respect to the liquid-crystal display also, the constituent parts have preferably been united with each other through adhesive layers as in the multilayered light diffusing plate according to the present invention, etc.

EXAMPLE 1

A 20 wt % dichloromethane solution containing 950 parts (parts by weight; the same applies hereinafter) of a norbornene resin (Arton, manufactured by JSR Co., Ltd.) and 50 parts of a liquid-crystal polymer represented by the following formula was used to obtain a 50 μm-thick film by casting. This film was stretched at 175° C. in a stretch ratio of 3. Thus, a light diffusing plate was formed which consisted of a birefringent film having a refractive index difference $\Delta n^1$ of 0.230 and a refractive index difference $\Delta n^2$ of 0.029. This light diffusing plate was bonded to a commercial polarizing plate having a total light transmittance of 41% and a degree of transmitted-light polarization of 99% with an acrylic pressure-sensitive adhesive layer so that $\Delta n^1$ directions coincided with the transmission axis. Thus, an optical element was obtained.

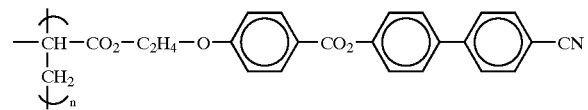

The birefringent film consisted of the norbornene resin as a film base and the liquid-crystal polymer dispersed therein as domains elongated along the stretch direction. The average diameter of these domains was measured through an examination with a polarizing microscope based on coloration by phase difference. As a result, the $\Delta n^1$-direction length thereof was found to be about 6 μm.

EXAMPLE 2

Three birefringent films which were the same as that obtained in Example 1 were superposed and bonded to each other through 20 μm-thick acrylic pressure-sensitive adhesive layers so that these films coincided with each other in $\Delta n^2$ direction. Thus, a light diffusing plate was obtained using this light diffusing plate, an optical element was obtained in the same manner as in Example 1.

EXAMPLE 3

A light diffusing plate was obtained in the same manner as in Example 1, except that the use amount of the norbornene resin was changed to 900 parts and a liquid-crystal polymer represented by the following formula was used in an amount of 100 parts. The light diffusing plate thus obtained consisted of a birefringent film having a $\Delta n^1$ of 0.180 and a $\Delta n^2$ of 0.032. Using this light diffusing plate, an optical element was obtained in the same manner as in Example 1. In copolymerization for producing the liquid-crystal polymer, a monomer corresponding to units "a" and one corresponding to units "b" were used in amounts of 45 parts and 55 parts, respectively. The birefringent film consisted of the norbornene resin as a film base and the liquid-crystal polymer dispersed therein as domains elongated along the stretch direction ($\Delta n^1$-direction length; about 6 μm).

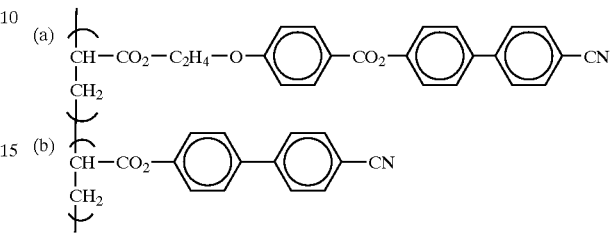

EXAMPLE 4

A light diffusing plate was obtained in the same manner as in Example 1, except that the use amount of the norbornene resin was changed to 900 parts and a liquid-crystal polymer represented by the following formula was used in an amount of 100 parts. The light diffusing plate thus obtained consisted of a birefringent film having a $\Delta n^1$ of 0.150 and a $\Delta n^2$ of 0.033. Using this light diffusing plate, an optical element was obtained in the same manner as in Example 1. The birefringent film consisted of the norbornene resin as a film base and the liquid-crystal polymer dispersed therein as domains elongated along the stretch direction ($\Delta n^1$-direction length; about 6 μm).

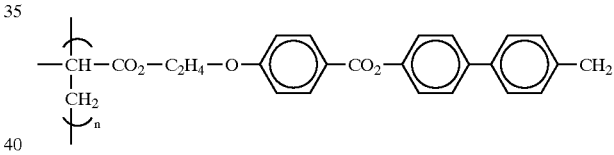

EXAMPLE 5

A mirror reflector, a polarizing plate, a TN liquid-crystal cell, and the optical element obtained in Example 1 were successively superposed and bonded in this order through an acrylic pressure-sensitive adhesive layer in such a manner that the light diffusing plate of the optical element faced the cell. Thus, a reflection type liquid-crystal display having the constitution shown in FIG. 3 was obtained. Each polarizing plate was disposed so that the direction of the transmission axis therefor coincided with the direction of rubbing on that side of the liquid-crystal cell which faced the polarizing plate.

Comparative Example

A light diffusing plate consisting of a film containing fine transparent particles was used to obtain an optical element in the same manner as in Example 1. Using this optical element, a liquid-crystal display was obtained in the same manner as in Example 3.

Evaluation Test 1

The optical elements obtained in Examples were examined for total light transmittance, diffuse transmittance, and haze with a Poick integrating sphere hazeometer according to ASTM D1003-61. The results obtained are shown in the following table. In this examination, light was caused to strike on each optical element from the polarizing plate side. In the table are also shown the results of an examination of each light diffusing plate alone; these data are given in parentheses.

|  | Total light transmittance (%) | Diffuse transmittance (%) | Haze |
|---|---|---|---|
| Example 1 | 41 (92) | 35 (37) | 85 (40) |
| Example 2 | 41 (90) | 39 (40) | 95 (44) |
| Example 3 | 40 (90) | 32 (48) | 80 (53) |
| Example 4 | 39 (90) | 30 (46) | 76 (51) |

The results given in the table show that each light diffusing plate less diffused linearly polarized light which had passed along the absorption directions for the polarizing plate and was highly effective in diffusing linearly polarized light which had passed along the transmission direction for the polarizing plate, based on the high haze anisotropy of the light diffusing plate. A comparison between Examples 1 and 2 shows that the superposition of birefringent films was effective in highly improving the diffuse transmittance and the haze while maintaining the total light transmittance and in attaining a greatly improved scattering effect, when the birefringent films were combined with a polarizing plate, although a decrease in total light transmittance due to reflection loss was observed.

Evaluation Test 2

The liquid-crystal displays obtained in Example 5 and Comparative Example were visually evaluated for contrast in on/off displaying. As a result, the display of the Example was found to be far more effective in diminishing the contrast decrease caused by the addition of the diffusing plate than that of Comparative Example. Namely, on the display of the Example, a clear image free from white blurring could be perceived in black displaying.

While the presently preferred embodiment of the present invention has been shown and described, it is to be understood that the disclosure is for the purpose of illustration and that various changes and modification may be made without departing from the scope of the invention as set forth in the appended claims.

What is claimed is:

1. An optical element comprising:
   a polarizing plate; and
   a light diffusing plate laminated on said polarizing plate, said light diffusing plate comprising a birefringent film containing dispersed therein minute regions differing from the birefringent film in birefringent characteristics,
   wherein the minute regions comprises a thermoplastic liquid-crystal polymer, and difference in refractive index between the birefringent film and the minute regions in a direction perpendicular to an axis direction in which a linearly polarized light has a maximum transmittance, $\Delta n^1$, is 0.03 or larger and that in said axis direction, $\Delta n^2$, is not larger than 80% of the $\Delta n^1$, and
   wherein the $\Delta n^1$ direction of said light diffusing plate is parallel to a transmission axis of said polarizing plate.

2. An optical element according to claim 1, wherein said thermoplastic liquid-crystal polymer is a thermoplastic branched liquid-crystal polymer having side chains each containing a segment represented by general formula (I): —Y—Z—, wherein Y is one of a polymethylene chain, a polyoxymethylene chain and a polyoxyethylene chain branching from a main chain and Z is a para-substituted cyclic compound.

3. An optical element according to claim 1, wherein said light diffusing plate contains the minute regions dispersedly formed by phase separation and each having a length in the $\Delta n^1$ direction of from 0.05 to 500 μm.

4. An optical element according to claim 2, wherein said light diffusing plate contains the minute regions dispersedly formed by phase separation and each having a length in the $\Delta n^1$ direction of from 0.05 to 500 μm.

5. An optical element according to claim 1, wherein said light diffusing plate comprises two or more birefringent films superposed on each other so that the $\Delta n^1$ directions of each of the birefringent film layer are parallel to those for one or two of the adjacent layer.

6. An optical element according to claim 2, wherein said light diffusing plate comprises two or more birefringent films superposed on each other so that the $\Delta n^1$ directions of each of the birefringent film layer are parallel to those for one or two of the adjacent layer.

7. An optical element according to claim 3, wherein said light diffusing plate comprises two or more birefringent films superposed on each other so that the $\Delta n^1$ directions of each of the birefringent film layer are parallel to those for one or two of the adjacent layer.

8. An optical element according to claim 4, wherein said light diffusing plate comprises two or more birefringent films superposed on each other so that the $\Delta n^1$ directions of each of the birefringent film layer are parallel to those for one or two of the adjacent layer.

9. A liquid-crystal display comprising a liquid-crystal cell and the optical element asccording to any one of claims 1 to 8 disposed on one or each side of said liquid-crystal cell.

10. A liquid-crystal display according to claim 9, wherein said optical element is disposed on a viewing side of said liquid-crystal cell, with said light diffusing plate of said optical element facing said liquid-crystal cell.

* * * * *